US009801110B2

(12) United States Patent
Roeland et al.

(10) Patent No.: US 9,801,110 B2
(45) Date of Patent: Oct. 24, 2017

(54) METHODS AND DEVICES FOR AVOIDANCE OF PARTIAL OFFLOADING OF TRAFFIC BEARERS

(71) Applicant: TELEFONAKTIEBOLAGET L M ERICSSON (PUBL), Stockholm (SE)

(72) Inventors: Dinand Roeland, Sollentuna (SE); Mattias Bergström, Stockholm (SE); Oumer Teyeb, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 259 days.

(21) Appl. No.: 14/498,954

(22) Filed: Sep. 26, 2014

(65) Prior Publication Data

US 2015/0092745 A1 Apr. 2, 2015

Related U.S. Application Data

(60) Provisional application No. 61/883,892, filed on Sep. 27, 2013.

(51) Int. Cl.
*H04W 36/00* (2009.01)
*H04W 36/22* (2009.01)
*H04W 36/28* (2009.01)

(52) U.S. Cl.
CPC ....... *H04W 36/22* (2013.01); *H04W 36/0022* (2013.01); *H04W 36/28* (2013.01); *H04W 36/0027* (2013.01)

(58) Field of Classification Search
CPC .......................... H04W 36/0083; H04W 36/22
See application file for complete search history.

(56) References Cited

U.S. PATENT DOCUMENTS 7,580,410 B2 * 8/2009 Chung .................. H04L 45/302
370/392
9,179,383 B2 * 11/2015 Kim ...................... H04W 36/14
9,516,567 B2 * 12/2016 Faccin .............. H04W 36/0022
(Continued)

FOREIGN PATENT DOCUMENTS

| EP | 2 469 930 A1 | 6/2012 |
|---|---|---|
| WO | 2013024054 A1 | 2/2013 |
| WO | 2013063429 A2 | 5/2013 |

OTHER PUBLICATIONS

"Deliverable DA2.2.22 Offloading Traffic from Cellular Networks with PBRM", Janne Tervonen, ICT SHOK Future Internet Programme, Jun. 30, 2010, 39 pages.
(Continued)

*Primary Examiner* — Rasheed Gidado
(74) *Attorney, Agent, or Firm* — Rothwell, Figg, Ernst & Manbeck, P.C.

(57) ABSTRACT

A method, implemented in a first node, that is in communication with a second node and a mobile device, includes determining a traffic type of a first traffic bearer within a packet data network connection between the second node and the mobile device. The method further includes marking the first traffic bearer as movable or non-movable based on the determined traffic type. The method also includes in response to determining that the first traffic bearer has been marked as non-movable, marking all other traffic bearers in the packet data network connection between the second node and the mobile device as non-movable.

30 Claims, 14 Drawing Sheets

(56) References Cited

U.S. PATENT DOCUMENTS

| | | | | |
|---|---|---|---|---|
| 2011/0058479 | A1* | 3/2011 | Chowdhury | H04L 45/04 370/237 |
| 2012/0142278 | A1* | 6/2012 | Wang | H04W 36/0016 455/68 |
| 2012/0300638 | A1* | 11/2012 | Zhou | H04W 8/082 370/236 |
| 2014/0010207 | A1* | 1/2014 | Horn | H04W 36/165 370/332 |
| 2014/0082697 | A1* | 3/2014 | Watfa | H04W 76/025 726/3 |
| 2014/0370895 | A1* | 12/2014 | Pandey | H04W 28/08 455/436 |

OTHER PUBLICATIONS

"Data offloading techniques in 3GPP Rel-10 Networks: A Tutorial", C. B. Sankaran, IEEE Communications Magazine, Jun. 2012, 8 pages.

"Traffic Offload Mechanism in EPC Based on Bearer Type", Longjiao Ma, 2011 7th International Conference on Wireless Communications, Networking and Mobile Computing (WiCOM), 4 pages.

"Providing EPC WLAN information to RAN", Ericsson, 3GPP TSG-RAN WG2 #84, 2013, Tdoc R2-134286, 8 pages.

Wi-Fi Alliance Hotspot 2.0 (Release 2) Technical Specification—Version 3.13, 2013, WiFi Alliance® Technical Committee Hotspot 2.0 Technical Task Group, 229 pages.

Ericsson Review, "Achieving carrier-grade Wi-Fi in the 3GPP world", 2012, 6 pages.

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401, V12.2.0, 2013, 293 pages.

3GPP, 3rd Generation Partnership Project; Technical Specification Group Services and System Aspects; Study on Wireless Local Area Network (WLAN) network selection for 3GPP terminals; Stage 2 (Release 12), 3GPP TS 23.865, V12.0.0, 2013, 45 pages.

3GPP, 3rd Generation Partnership Project; Technical Specification Group Services and System Aspects; Architecture enhancements for non-3GPP accesses (Release 12), 3GPP TS 23.402, V12.2.0, 2013, 256 pages.

3GPP, 3rd Generation Partnership Project; Technical Specification Group Radio Access Network; Evolved Universal Terrestrial Radio Access Network (E-UTRAN); S1 Application Protocol (S1AP) (Release 11), 3GPP TS 36.413, V11.5.0, 2013, 274 pages.

3GPP, 3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12), 3GPP TS 23.852, V12.0.0, 2013, 157 pages.

International Search Report and the Written Opinion of the International Searching Authority dated Dec. 16, 2014, in International Application No. PCT/SE2014/051131, 18 pages.

European Search Report issued in related Application No. 14850007.7 dated Jul. 6, 2016.

NEC, NTT Docomo, Samsung, "Do we need bearer identification in E-UTRAN?," 3GPP TSG SA WG2 Meeting #82, TD S2-105577, Nov. 15-19, 2010, Jacksonville, FL, 4 pages.

* cited by examiner

METHODS AND DEVICES FOR AVOIDANCE OF PARTIAL OFFLOADING OF TRAFFIC BEARERS

CROSS-REFERENCE TO RELATED APPLICATION

This application claims the benefit of U.S. Provisional Patent Application Ser. No. 61/883,892, filed Sep. 27, 2013, which is incorporated herein by reference in its entirety.

TECHNICAL FIELD

This disclosure relates generally to marking traffic bearers and, more particularly, to methods and devices for avoidance of partial offloading of marked traffic bearers

BACKGROUND

In 3GPP radio access technologies, a network decides when the mobile device shall handover from one cell to another cell. The network makes that decision based on radio measurement reports that the network requests from the mobile device and potential other information that is available to the network. A number of activities are ongoing to integrate WLAN with the 3GPP architecture. In the latest specification 3GPP Rel-11, this integration is still fairly undefined and the decision when to handover between 3GPP radio access and WLAN is left to the mobile device. Work is ongoing now to change this integration by letting the network decide when to handover between 3GPP and WLAN. When the network decides such an offload step, it also needs to decide what portion of this mobile device's traffic to handover. That is some traffic may stay at the source access, and some traffic may be moved to the target access. The terms "handover" and "offload" may be used interchangeably.

Fixed-Mobile Convergence (FMC) is a trend that has been on-going for many years now. The overall aim of FMC is to provide a seamless user experience (i.e., a particular service can be used anywhere at any time). The user is not troubled where the service is located or via which access technology the service is reached at a particular point in time. In the last few years efforts on FMC have mainly focused on integration of WLAN (Wireless Local Area Network) with 3GPP (3rd Generation Partnership Project) technologies. The vision is a heterogeneous network, where WLAN is integrated into the 3GPP Evolved Packet Core (EPC) just like any other cellular radio-access technology (RAT). See Achieving carrier-grade Wi-Fi in the 3GPP world, Ericsson Review, 2012.

Some of the key drivers for the integration of WLAN with 3GPP are: a) The large growth in mobile broadband traffic. To accommodate this, the unlicensed WLAN spectrum can serve as a complement to the 3GPP RAT spectrum; b) The wide support of WLAN in devices. Most modern mobile devices include both 3GPP radio and WLAN radio; c) The desire from operators to support the same services regardless access.

A 3GPP UE (User Equipment, a mobile device) can attach to a non-3GPP access network (e.g. a WLAN access network) and get connected to one or more PDNs (Packet Data Networks) via the S2 interface. See Achieving carrier-grade Wi-Fi in the 3GPP world, Ericsson Review, 2012. Each PDN connection is anchored in a 3GPP PGW (PDN GateWay). The UE receives one IP address/prefix for each PDN connection. It is the PGW that assigns the address/prefix. The S2 interface comes in three flavors: S2a, S2b and S2c. The latter two overlay the non-3GPP access network and do not impact it. S2a is a more converged solution that does impact the non-3GPP access. FIGS. 1 and 2 describe the concepts PDN, PGW, SGW, PDN connection, EPS bearer, TWAG, AC and AP. See also 3GPP TS 23.402, Architecture enhancements for non-3GPP accesses. Particularly, FIG. 1 shows how bearers and PDN connections work over a 3GPP radio access. In a WLAN access network, only a subset of this is supported today in Rel-11, which is illustrated in FIG. 2.

One of the 3GPP work items in this area is SaMOG ("Study on S2a Mobility based on GTP & WLAN access to EPC") 3GPP TR 23.852, Study on S2a Mobility based on GTP & WLAN access to EPC (SaMOG). The aim of SaMOG is to allow a UE to gain access to the 3GPP EPC using WLAN as access technology. The SaMOG study is performed in two phases. The first phase has already been finalized and released as part of 3GPP Rel-11. The result is captured in 3GPP TS 23.402, Architecture enhancements for non-3GPP accesses section 16.2. The first phase of SaMOG provides only a limited functionality, where no handover with IP address preservation between 3GPP and WLAN is supported. Also, the UE is restricted to have only a single PDN connection or a single offload connection via WLAN. The latter is used if an operator decides to offload the EPC in situations where an offload connection is setup. The UE's traffic is then not routed via EPC, but from the WLAN access network directly offloaded to Internet. This is contrary to a PDN connection that is always routed via EPC.

The second phase of SaMOG is ongoing. Two main scenarios are being studied as part of the second phase. The first scenario, "single-PDN scenario", is a small extension to the Rel-11 baseline with added support for IP address preservation upon a handover between 3GPP and WLAN. The second scenario, "multi-PDN scenario", includes not only support for handover with IP address preservation, but also support for multiple PDN connections via WLAN, and support for having one or more PDN connection via 3GPP simultaneous with one or more offload connections via WLAN. FIGS. 3 and 4 illustrate how a UE attaches to WLAN. This is a simplified copy of the call flow in 3GPP TS 23.402, Architecture enhancements for non-3GPP accesses section 16.2, with block 6 and handover support added as described in, for example, the single-PDN scenario in SaMOG 3GPP TR 23.852, Study on S2a Mobility based on GTP & WLAN access to EPC (SaMOG). It is noted that FIG. 3 shows the GTP option. PMIP is possible well, as described in 3GPP TS 23.402, Architecture enhancements for non-3GPP accesses.

FIG. 4 illustrates a simplified copy of the multi-PDN scenario in SaMOG 3GPP TR 23.852, Study on S2a Mobility based on GTP & WLAN access to EPC (SaMOG). In this example, the first connection is an offload connection. Attachment parameters for the first connection are sent as part of authentication (step 2). A second connection, a PDN connection in this example, is setup in block 5. The term "handover" used herein, in most cases, refers to handover between 3GPP access and non-3GPP access as defined in 3GPP TS 23.402, Architecture enhancements for non-3GPP accesses.

The SaMOG study defines how a UE attaches to the network, and in particular, how a PDN connection is setup via WLAN. The study does not specify which AP the UE attaches to. Neither does it specify under which conditions the UE can attach to a specific AP. On a high level, there are two methods to control a UE when to attach, and to which AP.

The first method is based on policies in the UE. These policies may be pre-configured in the UE, or may be downloaded from a network node. In a 3GPP architecture, such network node is called Access Network Discovery and Selection Function (ANDSF). A policy rule may e.g. say "Attach to SSIDx when it is available". Work is ongoing to further extend and refine the ANDSF policies. An example of such refined rule is to include performance measurements like "Attach to SSIDx only when the load of the AP is below a certain threshold". Such work is performed in 3GPP in the study "WLAN Network Selection" (WLAN_NS) 3GPP TS 23.865, WLAN Network Selection for 3GPP Terminals; Stage 2. Similar work is performed within Wi-Fi Alliance and their HotSpot 2.0 program Wi-Fi Alliance HotSpot 2.0.

In the second method, it is the network that decides when and where the UE shall attach. It then instructs the UE to do so by an explicit command. This way, policies are kept inside the network. The network mobility function may make its decision based on measurements performed by the UE (e.g., the UE may be attached to LTE). The network then instructs the UE to take measurements of the WLAN APs it sees. After receiving the measurement results, the mobility function decides which AP the UE shall attach to. Finally, the mobility function explicitly instructs the UE to attach.

FIGS. 5 and 6 define what IFOM (IP flow mobility) and MAPCON (Multi Access PDN Connectivity) is. See 3GPP TS 23.402, Architecture enhancements for non-3GPP accesses for a more detailed description.

Traffic steering from one RAT to another RAT may be triggered in different ways. While not critical for this invention some alternatives are explained below.

Traffic steering from one Radio Access Technology (RAT) to another RAT may be triggered in different ways. The network may initiate traffic steering of a UE's traffic by sending a traffic steering command to the terminal. The traffic steering command may contain an indicator which points to a bearer or group of bearers, for example, a bearer index indicating to the UE that the indicated bearer should be moved. Another indicator is a QCI number and the bearers with the indicated QCI should be moved. It may be so that if there is no indicator present in the traffic steering command the terminal will move all traffic. However, as explained in further detail below, the 3GPP RAN may not know which Packet Data Network (PDN) a bearer belongs to and hence, may initiate traffic steering which results in partial PDN connection offloading.

The 3GPP RAN may indicate to a terminal that a first bearer should be moved to WLAN without indicating that second bearer belonging to the same PDN connection should be moved to WLAN. In this regard, a problem exists in that it is not possible to have a PDN connection where one or more bearers of that connection go over radio access technology A and one or more bearers of the same connection go over radio access technology B. Thus, it is not possible to perform a handover of a single bearer within a PDN connection to another radio access technology. Instead, the handover needs to be done on the granularity of a PDN connection. More specifically, current specifications require that if a UE has multiple PDN connections to an Access Point Name (APN) X, then that complete set of PDN connections has to be routed over the same radio access. This implies that if the UE wants to handover a PDN connection to another radio access technology, then the UE should handover all PDN connections of that PDN to the other access technology. An APN may be a string representing the name of a PDN.

Traffic steering may also be initiated by the terminal itself. This can be initiated based on a rule in the terminal, e.g., that the terminal should initiate traffic from a first RAT to another RAT if the signal quality in the first RAT is below a threshold and/or the signal quality in the second RAT is above a threshold. The terminal may then initiate traffic steering to that other RAT. The terminal may only initiate traffic steering for a subset of the ongoing traffic, e.g. keep a voice connection in one RAT suitable for voice service and steer an FTP download session in another RAT which currently is providing higher throughput.

Thus, when an offloading is performed, for example from 3GPP to WLAN, all the bearers belonging to a PDN connection either have to be offloaded together to WLAN, or they have to remain with the 3GPP network. As mentioned above, even within the same PDN connection, some bearers might be eligible for offloading to WLAN and some might be not. Thus, when offloading is performed, the PDN connection can be moved to WLAN only in the case that all the bearers belonging to that PDN connection are eligible for offloading (hereafter by "moving a PDN connection", it is meant that PDN connection is now access via the target network).

For the RAN to be able to perform a proper offloading, it has to know 1) the eligibility of all bearers for offloading and 2) which bearers belong to which PDN connection. Currently, RAN is not aware of the mapping of the bearers with PDN connections.

SUMMARY

According to some embodiments, a method, implemented in a first node, that is in communication with a second node and a mobile device, includes determining a traffic type of a first traffic bearer within a packet data network connection between the second node and the mobile device. The method further includes marking the first traffic bearer as movable or non-movable based on the determined traffic type. The method also includes in response to determining that the first traffic bearer has been marked as non-movable, marking all other traffic bearers in the packet data network connection between the second node and the mobile device as non-movable.

According to some embodiments, a method, implemented in a mobile device, that is in communication with a first node and a second node in a first communication network includes receiving a notification indicating the movability of a first traffic bearer within a packet data network connection between the mobile device and the second node. The method further includes initiating traffic steering to a second communications network based on one or more predetermined conditions.

In some embodiments, a first node that is in communication with a second node and a mobile device includes a processor, a memory coupled to the processor, a transceiver coupled to the processor; and an antenna coupled to the transceiver configured to transmit and receive messages. The processor is configured to determine a traffic type of a first traffic bearer within a packet data network between the second node and the mobile device. The processor is further configured to mark the first traffic bearer as movable or non-movable based on the determined traffic type. The processor is also configured to in response to determining that the first traffic bearer has been marked as non-movable, marking all other traffic bearers in the packet data network connection between the second node and the mobile device as non-movable.

In some embodiments, a mobile device, that is in communication with a first node and a second node in a first communication network, includes a processor, a memory coupled to the processor, a transceiver coupled to the processor; and an antenna coupled to the transceiver configured to transmit and receive messages. The processor is configured to receive a notification indicating the movability of a first traffic bearer within a packet data network connection between the mobile device and the second node. The processor is also configured to initiate traffic steering to a second communication network based on one or more predetermined conditions.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
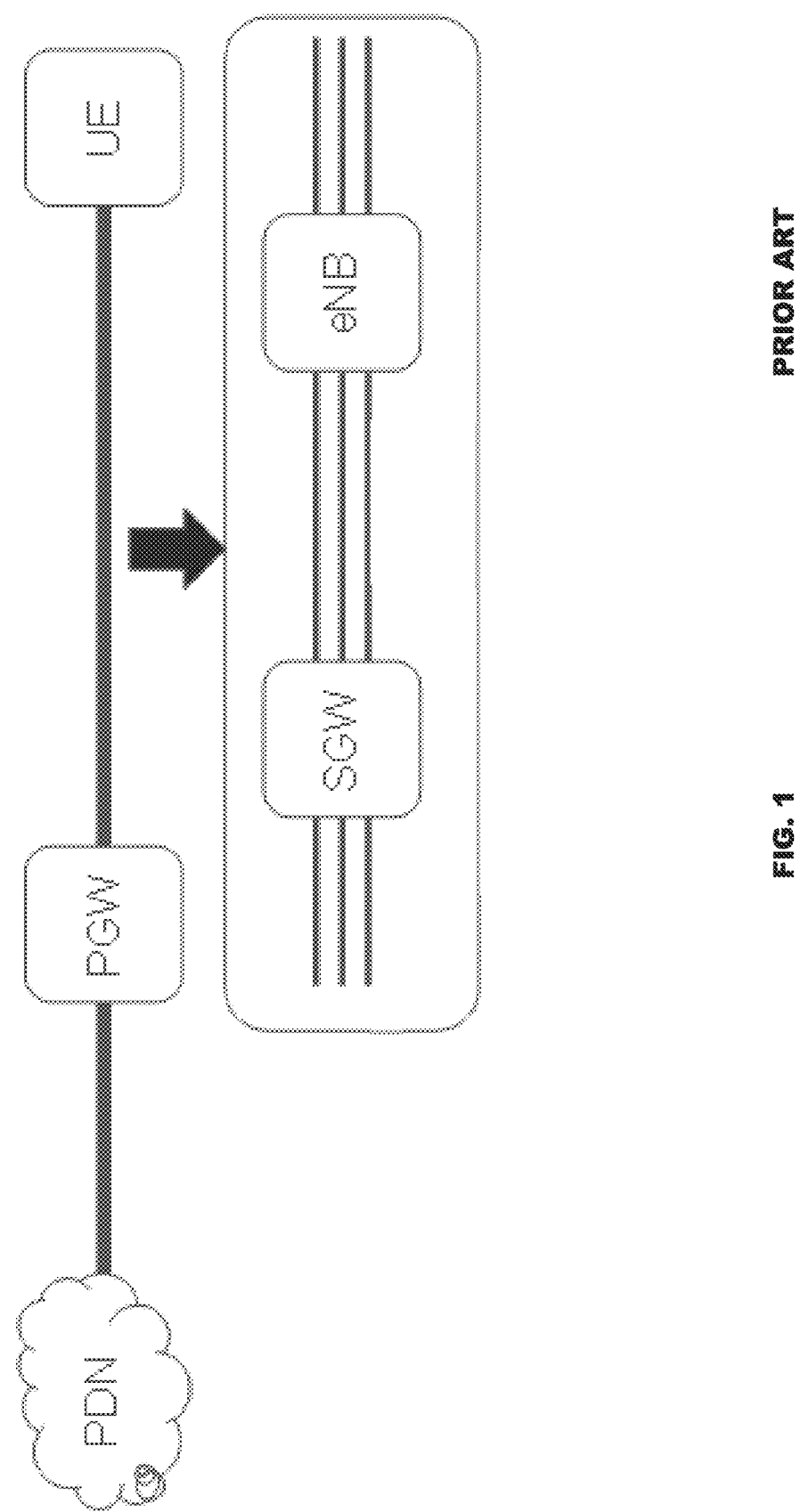
FIGS. 1 and 2 illustrate a communication network with one or more traffic bearers.
Figure 2:
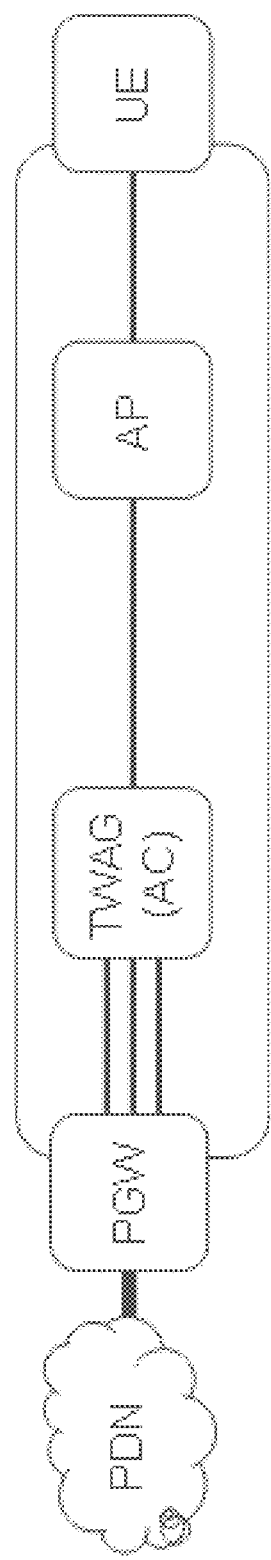
Figure 3:
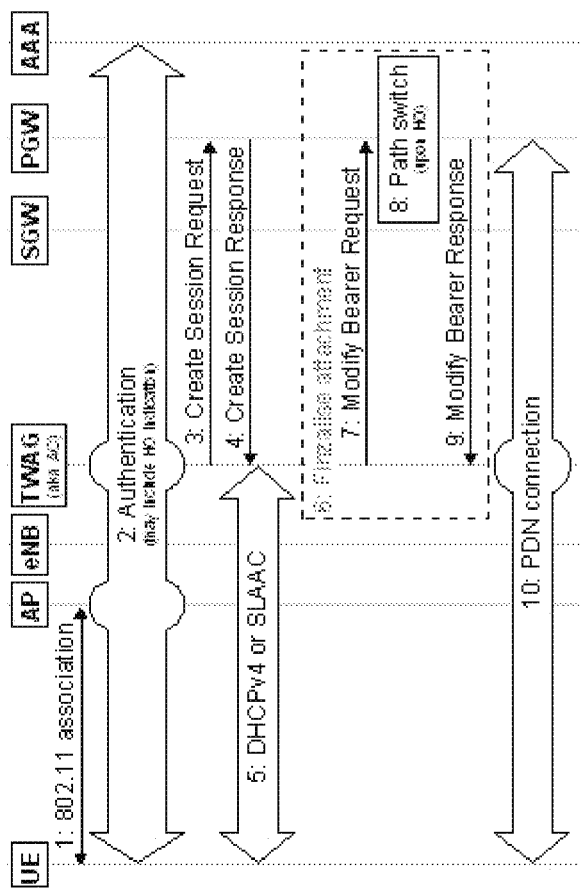
FIGS. 3 and 4 illustrate how a UE attaches to a WLAN.
Figure 4:
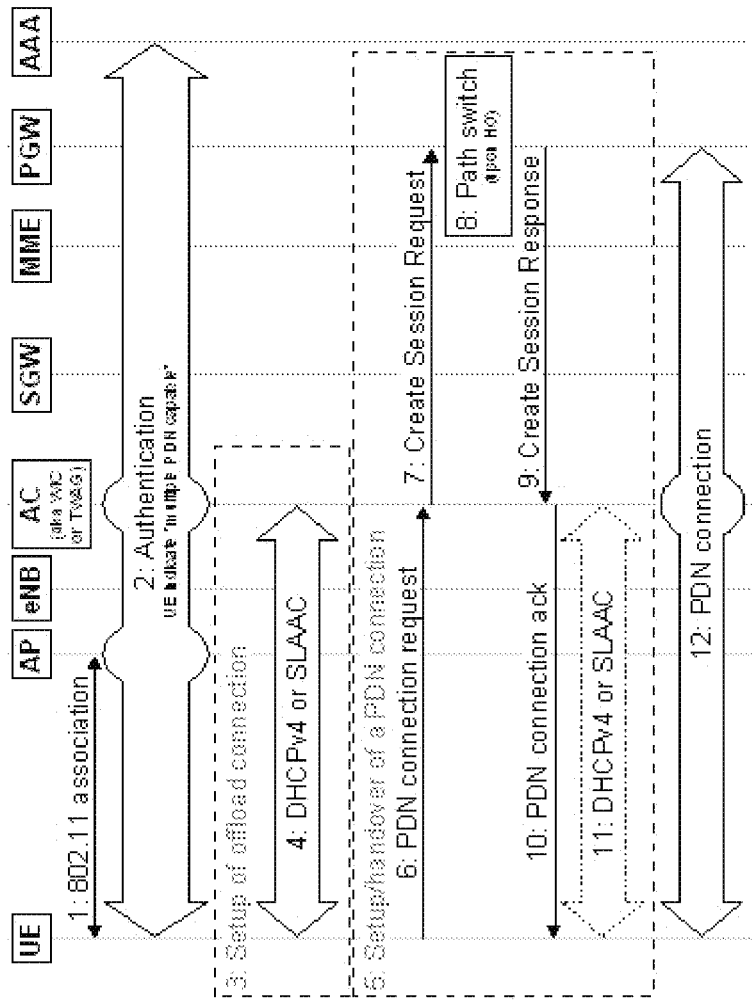
Figure 5:
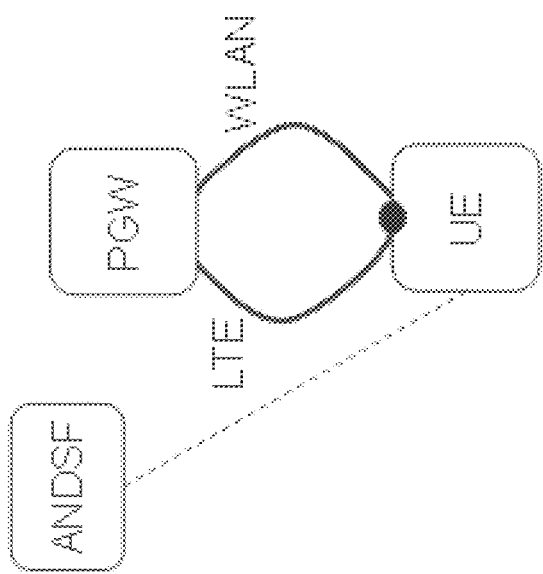
FIGS. 5 and 6 illustrate IP flow mobility and Multi Access PDN Connectivity.
Figure 6:
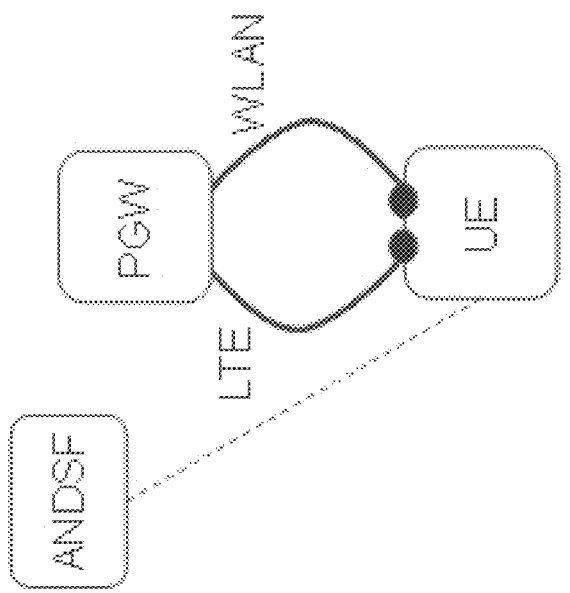
Figure 7:
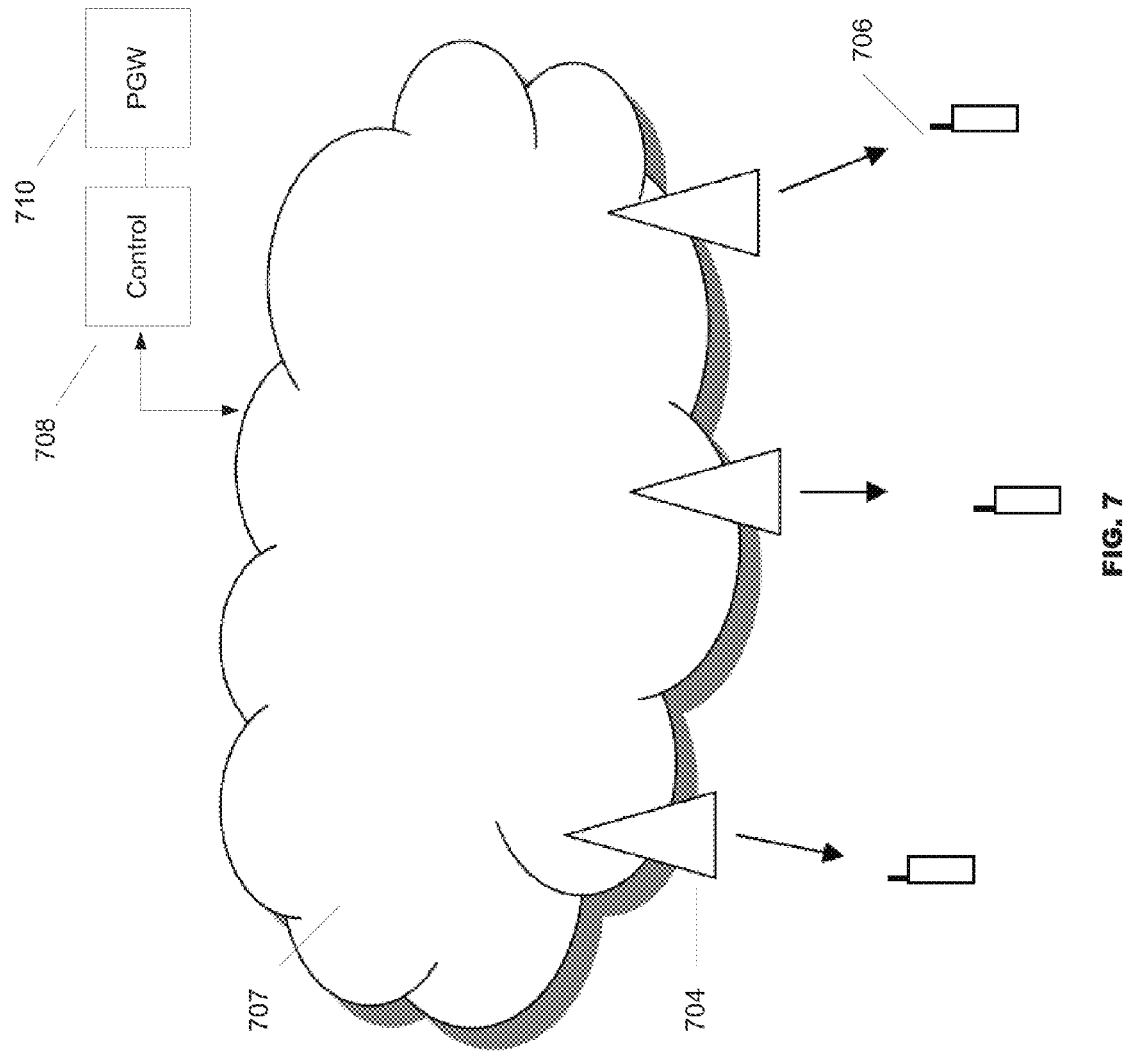
FIG. 7 is an exemplary illustration of a communications network.

Referring to FIG. 7, a wireless communication deployment 700 in accordance with exemplary embodiments includes an access node 704 serving a wireless communication device (WCD) 706. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 706 may be a legacy UE or dynamic TDD capable UE. Access node 704 may be, for example, a base station, an eNodeB, a relay node, or a gateway type device, is capable of communicating with device 706, and includes any additional elements suitable to support wireless communication between wireless communication devices or between a wireless communication device and another communication device, such as a landline telephone. The access node 704 may be in communication with, for instance via a network 702, one or more control nodes 708 and packet gateways 710. The control node 708 may be a core network node, Radio Network Controller (RNC), a Mobility Management Entity (MME), a Mobile Switching Center (MSC) or Base Station Subsystem (BSS). Although node 708 is explicitly identified as a control node, each of nodes 704, 706, and 710 may be understood as a "control" node to the extent that it includes a control unit or otherwise implements control functions.

Figure 8:
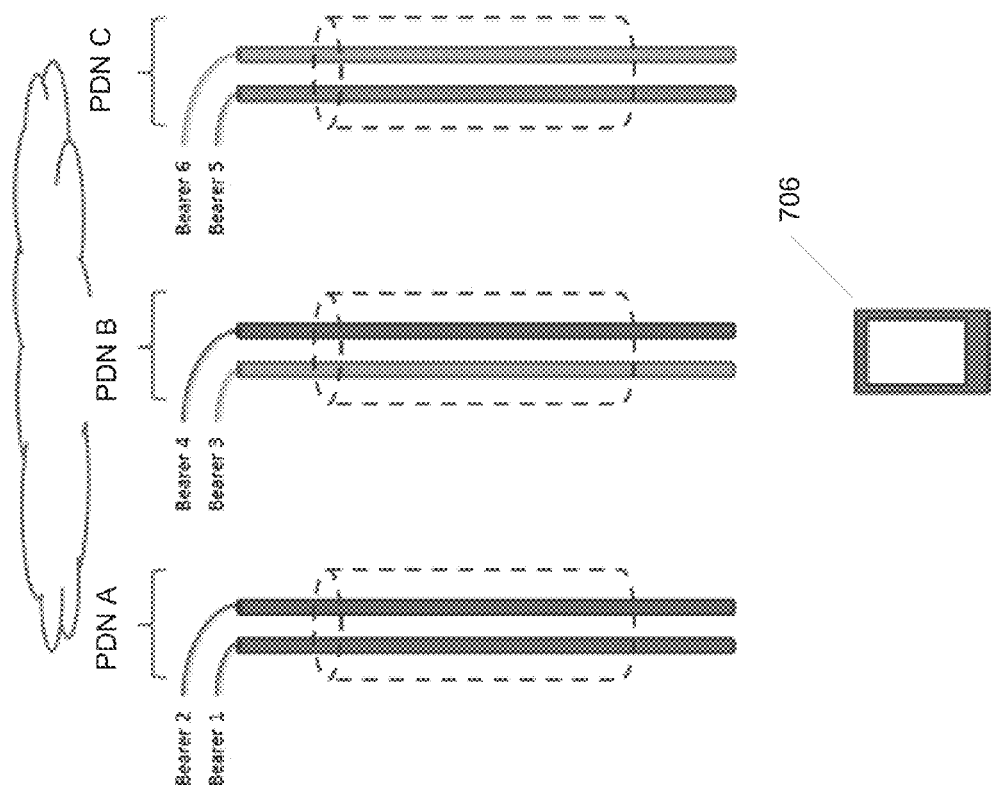
FIG. 8 is an exemplary illustration of multiple traffic bearers

FIG. 8 illustrates an embodiment in which a UE has multiple PDN connectivity. Exemplary embodiments address, for example, a scenario where a UE, that may be connected via a 3GPP access link, has multiple bearers, possibly associated via multiple PDN connections, as shown in FIG. 8, and there is a need to offload some of the UE's bearers to another access network, such as WLAN. Some of these bearers might not be eligible to be offloaded to WLAN (e.g. voice traffic), while others are eligible to be offloaded (e.g. buffered streaming video).

Bearers may be moved/steered/offloaded from one RAT to another. It is noted that in some RATs, the concept of a bearer is not established, however, the embodiments herein apply to other concepts as well. According to exemplary embodiments, the term partial PDN connection offloading is used to refer to the situation where within a PDN connection, at least some bearers are steered to another radio access. For example, within a single PDN connection, partial offloading occurs where some bearers are steered to radio access A. Another example of partial offloading includes, within a single PDN connection, steering some bearers to radio access A and some bearers to radio access B.

In some embodiments, procedures are implemented to ensure that a partial offloading is avoided. The scenario depicted in FIG. 8 is used to describe the different procedures and it is assumed, in some embodiments, that bearers 1,2 and 4 are not eligible for offloading while bearers 3, 5 and 6 are eligible for offloading.

In some embodiments a core network entity marks bearers with an indication of whether the bearer is a candidate for being steered to an alternative RAT or not (i.e., the core network marks whether the bearers are "movable" or "non-movable"). According to this movability marking embodiments, a core network node performs the marking such that each bearer is assigned movability individually.

As an example, the core network entity indicates that a bearer is movable or not by including a new information element (IE), referred to as a Movability IE, along with other QoS parameters (such as QCI, ARP, GBR and MBR), in the bearer setup signaling from the P-GW to the S-GW and then to the MME as in 3GPP TS 23.401. According to some embodiments, upon establishment of a default bearer, the Moveability IE is sent from the PGW or SGW to the MME in a Create Session Response along with existing information elements (e.g., EPS Bearer, QoS, etc.) included in the Create Session Response. In some embodiments, for the creation of bearers other than the default bearer, the Moveability IE is sent from the PGW or SGW to the MME in a Create Bearer Request along with existing information elements (e.g., EPS Bearer, QoS, etc.) included in the Create Bearer Request. The Movability IE can be further passed, in some embodiments, on to the eNB in the E-RAB Setup Request message, either as part of the NAS-PDU that is transparent to the eNB or as part of the E-RAB QoS parameters that the RAN can understand. Furthermore, in some embodiments, the Movability IE can be sent from the MME to the UE via the eNB using a NAS-PDU, which is a container sent from the MME to the UE via the eNB.

This embodiment results in some bearers, within a PDN connection, being marked as movable, while other bearers within the same PDN connection are marked as non-movable. In the example shown in FIG. 8 the core network node would, according to this approach, indicate that bearers 1, 2 and 4 are non-movable, while bearers 3, 5 and 6 are movable.

According to some embodiments, a core network node performs movability marking such that all bearers which belong to a certain PDN connection are either marked as being movable, or they are all marked as being non-movable. That is, the core network node avoids the situation that within a certain PDN connection some of the bearers are marked as movable while some of the bearers are marked as non-movable. The core network node does this by inspecting if at least one of the bearers belonging to a PDN connection is non-movable, and in response to finding a non-movable bearer, indicating that all bearers belonging to the PDN connection are non-movable. If, however, all bearers within the PDN connection are movable, then the core network node marks all the bearers within that PDN connection as movable. In the example shown in FIG. 8, since bearers 1, 2 and 4 are not eligible for offloading, the core network node would, according to this embodiment, indicate that bearers 1, 2, 3 and 4 are non-movable while bearers 5 and 6 are movable. If later on, bearer 4 is torn down (i.e., removed), an indication is sent to the UE that bearer 3 is movable, as the only reason that it was indicated to be non-movable was due to the existence of a non-movable bearer within the same PDN connection.

In some embodiments, to modify the movability of already setup bearers, when a new bearer is setup, two methods may be used. In the first method, along with the messages to setup the new bearer, a bearer modification message is sent that modifies the movability IE of all the concerned bearers (e.g. E-RAB Modify Request message sent from the MME to the eNB 3GPP TS 36.413 Evolved Universal Terrestrial Radio Access Network (E-UTRAN) S1 Application Protocol (S1AP)). In a second method, an enhanced bearer setup message is sent that includes the other affected bearers whose movability is to be changed (e.g. an enhanced E-RAB Setup Request that lists the other bearers whose movability is to be changed).

In some embodiments, in order to modify the movability of already setup bearers when a bearer is to be torn down, two methods may be used. In a first method, along with the messages to tear down the new bearer, a bearer modification message is sent that modifies the movability IE of all the concerned bearers (e.g. E-RAB Modify Request message that indicates the changes of the movability sent from the MME to the eNB. In a second method, an enhanced bearer release message is sent that includes the other affected bearers whose movability is to be changed (e.g. an enhanced E-RAB Release Request message that lists the other bearers whose movability is to be changed).

According to some embodiments, for traffic steering initiation, the RAN initiates traffic steering such that offloading is initiated for all of a UE's movable bearers, even if traffic steering may only have been preferred for a subset of the movable bearers. If the movability indication approach, where all traffic bearers belonging to a same PDN are marked similarly, is used together with this traffic steering initiation approach, then it is ensured that partial PDN connection offloading is avoided.

If, in the example depicted in FIG. 8, the core network node has indicated that bearers 3, 5 and 6 are movable, the RAN may, when initiating offloading for a UE, initiate offloading for bearers 3, 5 and 6. However, as bearer 4 (which is non-movable) is in the same PDN connection as bearer 3, a partial PDN connection offloading would normally happen, which is prevented if the terminal performs the procedures to similarly handle all traffic bearers belonging to the same PDN. The traffic steering command may contain an indication that the UE should perform offloading of all movable bearers. For example, the traffic steering command may contain a one bit flag which indicates to the UE that the UE should perform offloading of all movable bearers.

It is understood by one of ordinary skill in the art that other triggers for traffic steering can be used aside from the RAN initiated traffic steering. For example, the UE may, based on a rule which could consider radio conditions etc., initiate traffic steering.

According to some embodiments, where traffic bearers are marked individually, for traffic steering initiation, the RAN initiates traffic steering only for the movable bearers which steering is preferred for by the RAN. To avoid performing partial PDN connection offloading, the terminal may need to perform the following additional procedures.

Procedures performed in the terminal are disclosed to ensure that partial PDN connection offloading is avoided. In some embodiments, the terminal will, upon traffic steering execution of a bearer from a first RAT to a second RAT, make sure that traffic steering is done such that all bearers within the same PDN connection are steered on the same RAT. This can be done by including other bearers in the traffic steering, or by refraining from steering a bearer.

According to some embodiments, when executing steering of a bearer, if a situation exists in which all other bearers in the same PDN connection are movable to the second RAT, the terminal should steer all bearers in that PDN connection to the other RAT. If in the example depicted in FIG. 8, the UE should steer bearer 5 to another RAT, it would also steer bearer 6 to the same RAT in order to avoid a partial PDN connection offloading.

According to some embodiments, when executing steering of a bearer X, if the situation occurs where not all other bearers in the same PDN connection are movable to the second RAT, a terminal that is not capable of partial offloading may refrain from steering bearer X. If, in the example depicted in FIG. 8, the UE may refrain from steering bearer 3 to another RAT as bearer 4 that belongs to the same PDN connection is non-movable. When the UE refrains from steering a set of one or more bearers, even though the RAN is requesting it, the UE may send a NACK message to the RAN signifying the reason for this decision.

Figure 9:
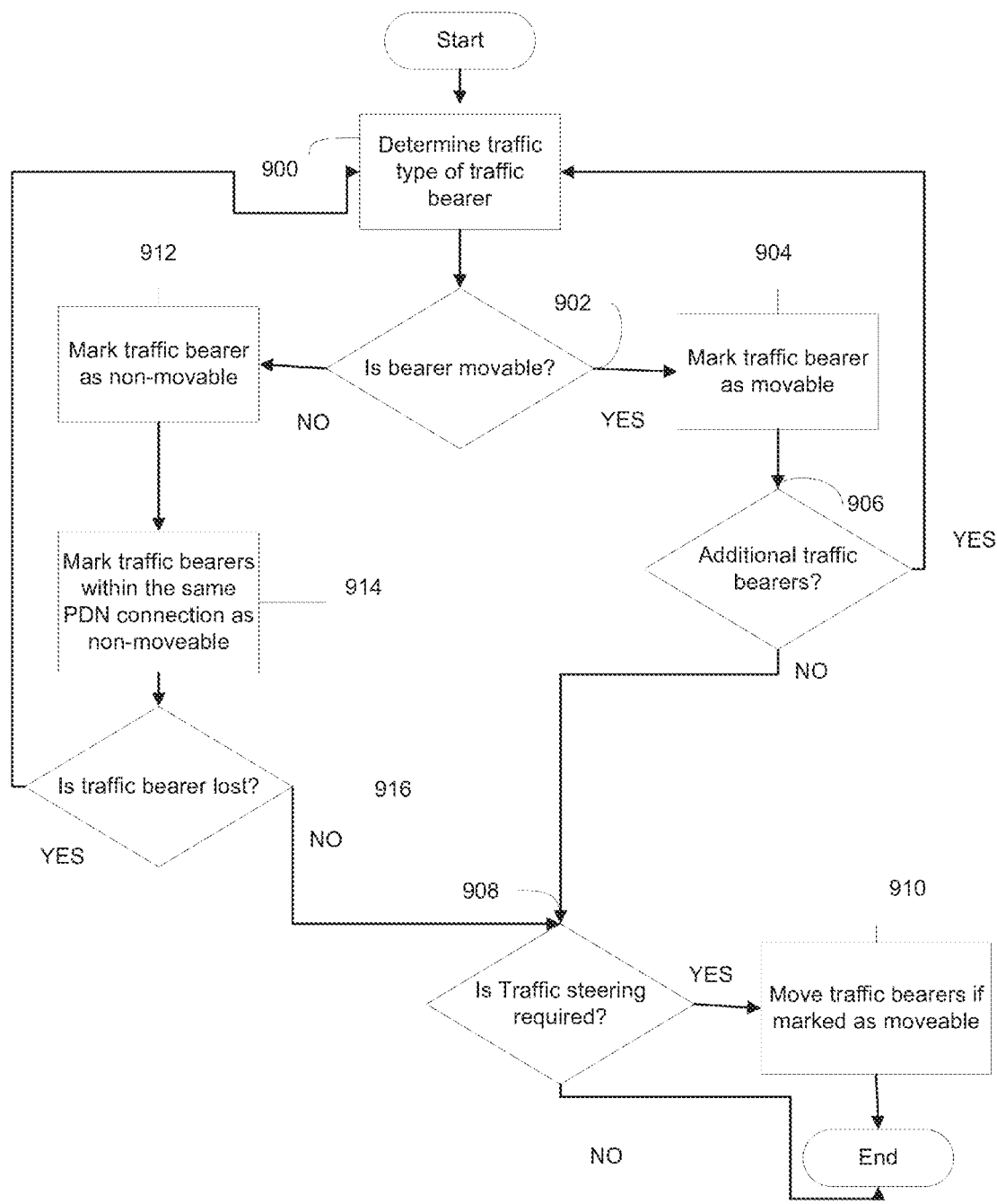
FIG. 9 is an exemplary illustration of a process performed by a core network node.

FIG. 9 illustrates an embodiment of a process performed by a control network node. The process may start at 900 where a traffic type of a traffic bearer within a PDN connection is determined. Step 900 may be triggered, for example, when a new bearer is added to the PDN connection. In step 902, it is determined if the traffic bearer is movable. For example, a traffic may be marked as movable if it is determined that the traffic type of the bearer is video but would be marked as non-movable if the traffic type of the bearer was voice data. If the traffic bearer is moveable (e.g., video streaming), the process marks the traffic bearer as movable in step 904 and then proceeds to step 906. In step 906, it is determined whether there are additional bearers in the PDN connection. If there are additional bearers in the PDN connection, the process returns to step 900 to determine whether the additional bearer is movable. If it is determined in step 906 that there are no additional traffic bearers, the process proceeds to step 908, where it is determined if traffic steering is required. If traffic steering is required, the process moves to step 910 to move all traffic bearers if the traffic bearers are marked as moveable.

If the traffic bearer is not marked as moveable in step 902, the process proceeds to step 912 to mark the traffic bearer as non-movable and then proceeds to step 914. In step 914, all traffic bearers within the same PDN connection as the previously marked bearer are marked as non-movable, and then the process proceeds to step 916. In step 916, it is determined if the traffic bearer is lost (e.g., the bearer that caused all bearers within the PDN connection to be marked as non-movable). If the traffic bearer is not lost, the process proceeds to 908. If the traffic bearer is lost, the process returns to step 900, which causes the movability of the remaining traffic bearers within the same PDN connection to be updated.

Figure 10:
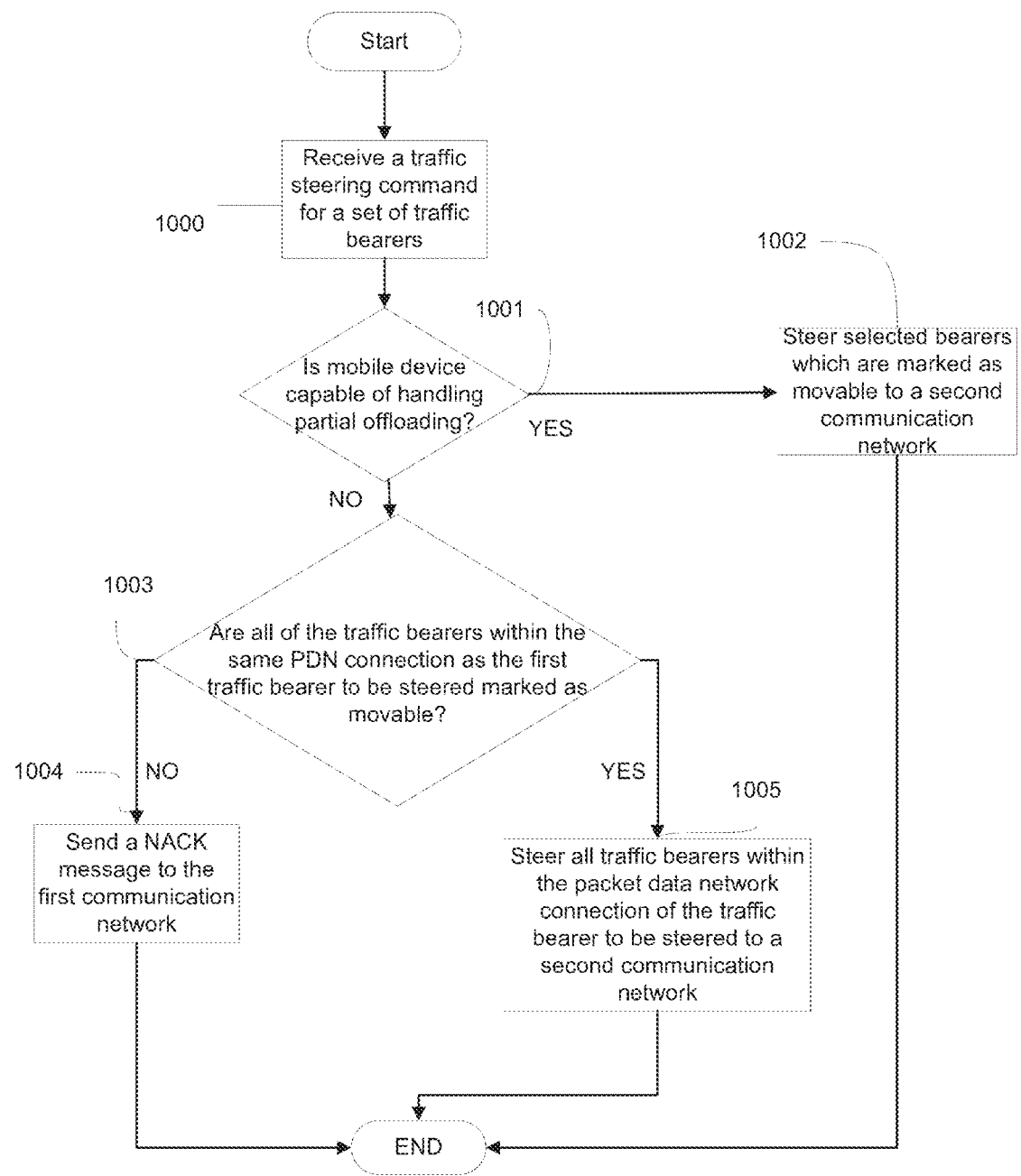
FIG. 10 is an exemplary illustration of a process performed by a mobile device.

FIG. 10 illustrates an embodiment of a process performed by a mobile device. The process may start at 1000 where the mobile device receives a traffic steering command for a set of traffic bearers. The process then proceeds to step 1001 where it is determined if the mobile device is capable of handling partial offloading. If the mobile device is capable of handling partial offloading, then in step 1002, the mobile device will steer all of the bearers selected in the traffic steering command which are marked as movable to a second communication network. In further embodiments, in step 1001, it is also determined whether the first and second communication networks are capable of handling partial offloading.

If the mobile device is not capable of handling partial offloading, then in step 1003, for the first traffic bearer to be steered, the mobile device will determine if each traffic bearer within the same PDN connection as the first traffic bearer to be steered are marked as movable. If a traffic bearer within the PDN connection of the first traffic bearer to be moved is not movable, then in step 1004, the mobile device sends a NACK message to the first communication network. If all of the traffic bearers within the same PDN connection as the first traffic bearer to be steered are marked as movable, then in step 1005 the mobile device will steer all of the traffic bearers within that PDN connection to a second communication network. One of ordinary skill in the art would recognize that steps 1003-1005 should be repeated for the remaining traffic bearers within the traffic steering command received in step 1000.

The benefit the embodiments described herein is that when the RAN is initiating the traffic steering, it does not need to be aware of which PDN connection(s) the bearer(s) belong to.

Figure 11:
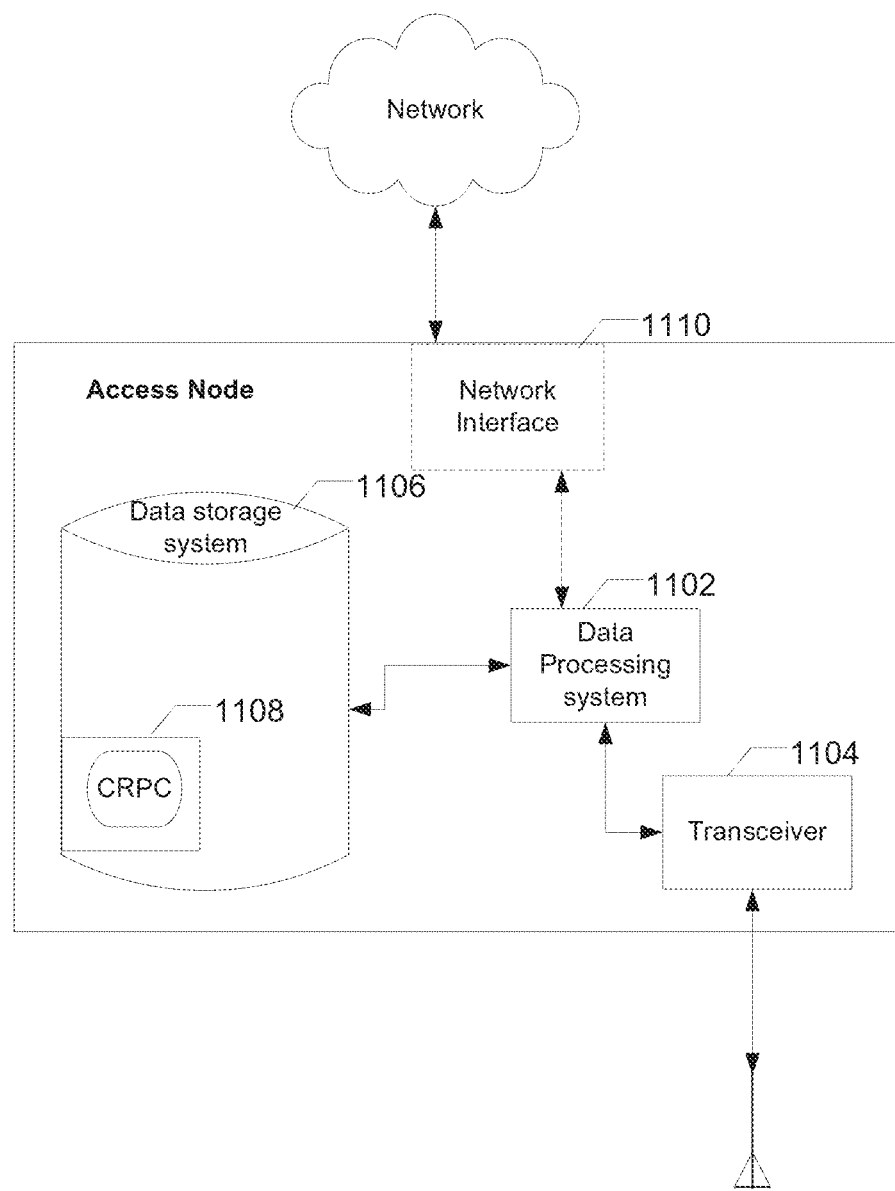
FIG. 11 is an exemplary illustration of an access node.

FIG. 11 illustrates a block diagram of an exemplary access node, such as node 704 shown in FIG. 7. As shown in FIG. 11, the access node 704 may include: a data processing system 1102, which may include one or more microprocessors and/or one or more circuits, such as an application specific integrated circuit (ASIC), field-programmable gate arrays (FPGAs), and the like; a network interface 1110; a transceiver 1104, and a data storage system 1106, which may include one or more non-volatile storage devices and/or one or more volatile storage devices (e.g., random access memory (RAM)). According to some embodiments, the data processing system 1102 may comprise a control unit used for selection of transmission parameters.

In embodiments where data processing system 1102 includes a microprocessor, computer readable program code (CRPC) 1108 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1102 to perform steps necessary to perform the procedures described above. In other embodiments, the access node 704 is configured to perform steps described herein without the need for code. That is, for example, data processing system 1102 may consist merely of one or more ASICs. Hence, the features of the embodiments described herein may be implemented in hardware and/or software. For example, in particular embodiments, the functional components of the base station described above may be implemented by data processing system 1102 executing computer instructions, by data processing system 1102 operating independent of any computer instructions, or by any suitable combination of hardware and/or software.

Figure 12:
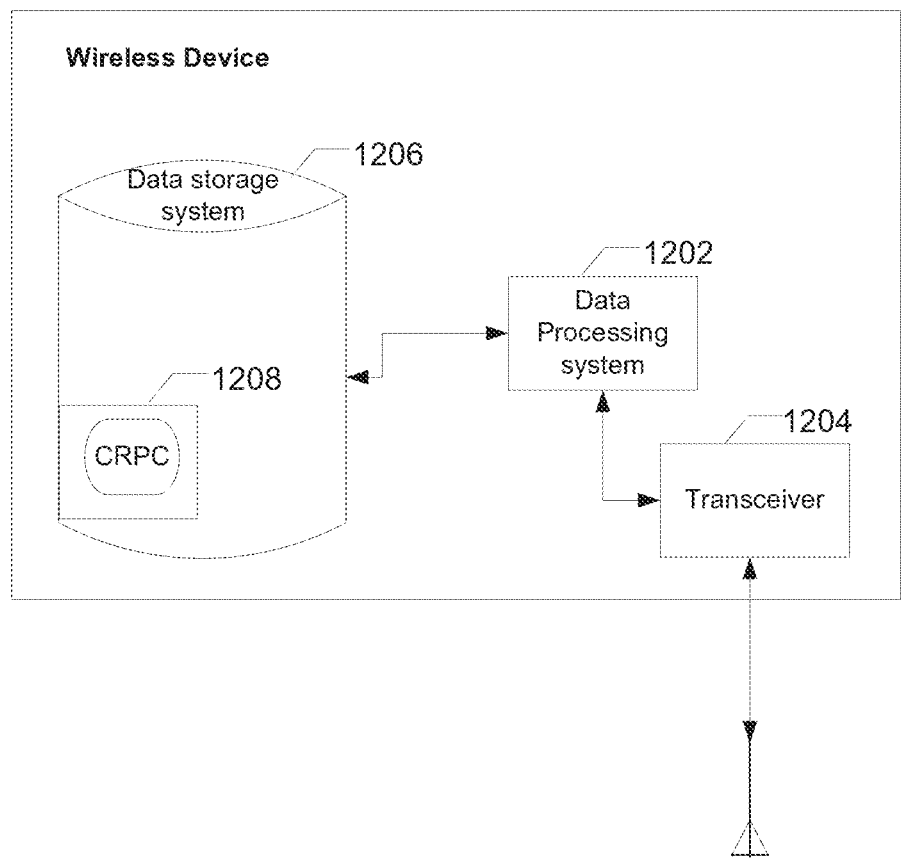
FIG. 12 is an exemplary illustration of a wireless device.

FIG. 12 illustrates a block diagram of an exemplary wireless device, such as device 706 shown in FIG. 7. As shown in FIG. 12, the device 706 may include: a data processing system 1202, which may include one or more microprocessors and/or one or more circuits, such as an application specific integrated circuit (ASIC), field-programmable gate arrays (FPGAs), and the like; a transceiver 1204, and a data storage system 1206, which may include one or more non-volatile storage devices and/or one or more volatile storage devices (e.g., random access memory (RAM)). According to some embodiments, the data processing system 1202 may comprise a control unit used for selection of transmission parameters.

In embodiments where data processing system 1202 includes a microprocessor, computer readable program code (CRPC) 1208 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1202 to perform steps to implement the procedures described above. In other embodiments, the device 706 is configured to perform steps described herein without the need for code. That is, for example, data processing system 1202 may consist merely of one or more ASICs. Hence, the features of the embodiments described herein may be implemented in hardware and/or software. For example, in particular embodiments, the functional components of the base station described above may be implemented by data processing system 1202 executing computer instructions, by data processing system 1202 operating independent of any computer instructions, or by any suitable combination of hardware and/or software.

Figure 13:
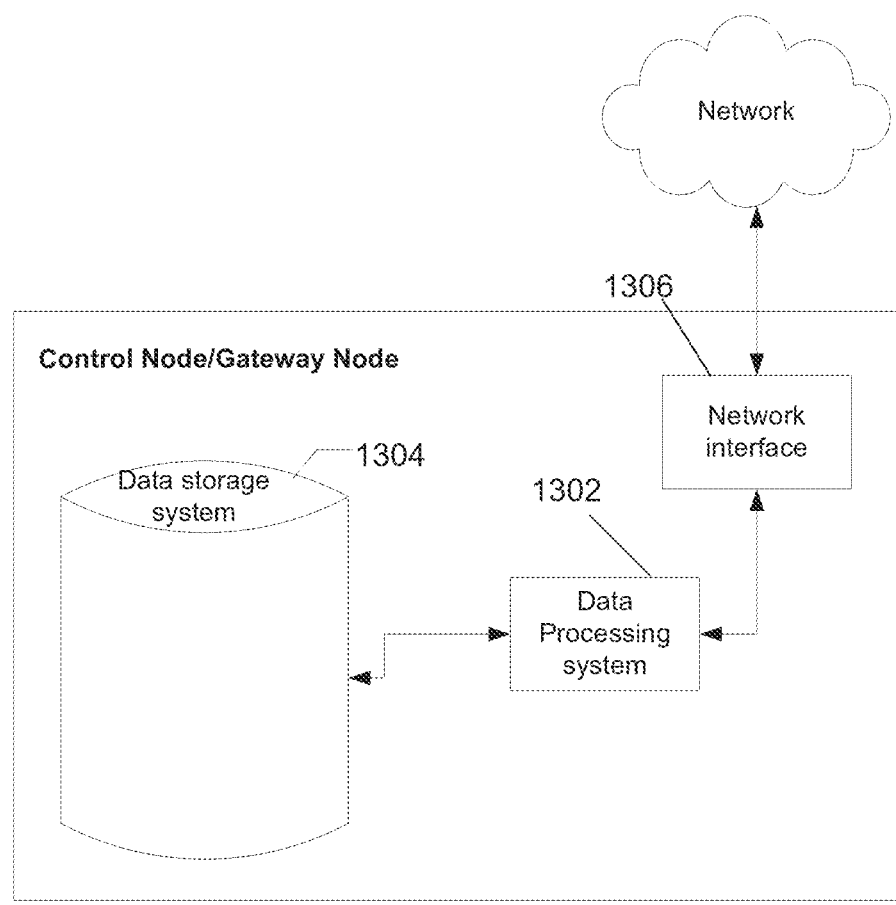
FIG. 13 is an exemplary illustration of a packet gateway node.

FIG. 13 illustrates a block diagram of an exemplary gateway node 710 shown in FIG. 7. As shown in FIG. 13, the gateway node 710 may include: a data processing system 1302, which may include one or more microprocessors and/or one or more circuits, such as an application specific integrated circuit (ASIC), field-programmable gate arrays (FPGAs), and the like; and a network interface 1306 According to some embodiments, the data processing system 1302 may comprise a control unit used for selection of transmission parameters.

In embodiments where data processing system 1302 includes a microprocessor, computer readable program code (CRPC) may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1302 to perform steps described above (e.g., steps described above with reference to the flow charts shown in FIG. 9). In other embodiments, the gateway node 710 is configured to perform steps described herein without the need for code. That is, for example, data processing system 1302 may consist merely of one or more ASICs. Hence, the features of the embodiments described herein may be implemented in hardware and/or software. For example, in particular embodiments, the functional components of the base station described above may be implemented by data processing system 1302 executing computer instructions, by data processing system 1302 operating independent of any computer instructions, or by any suitable combination of hardware and/or software.

Figure 14:
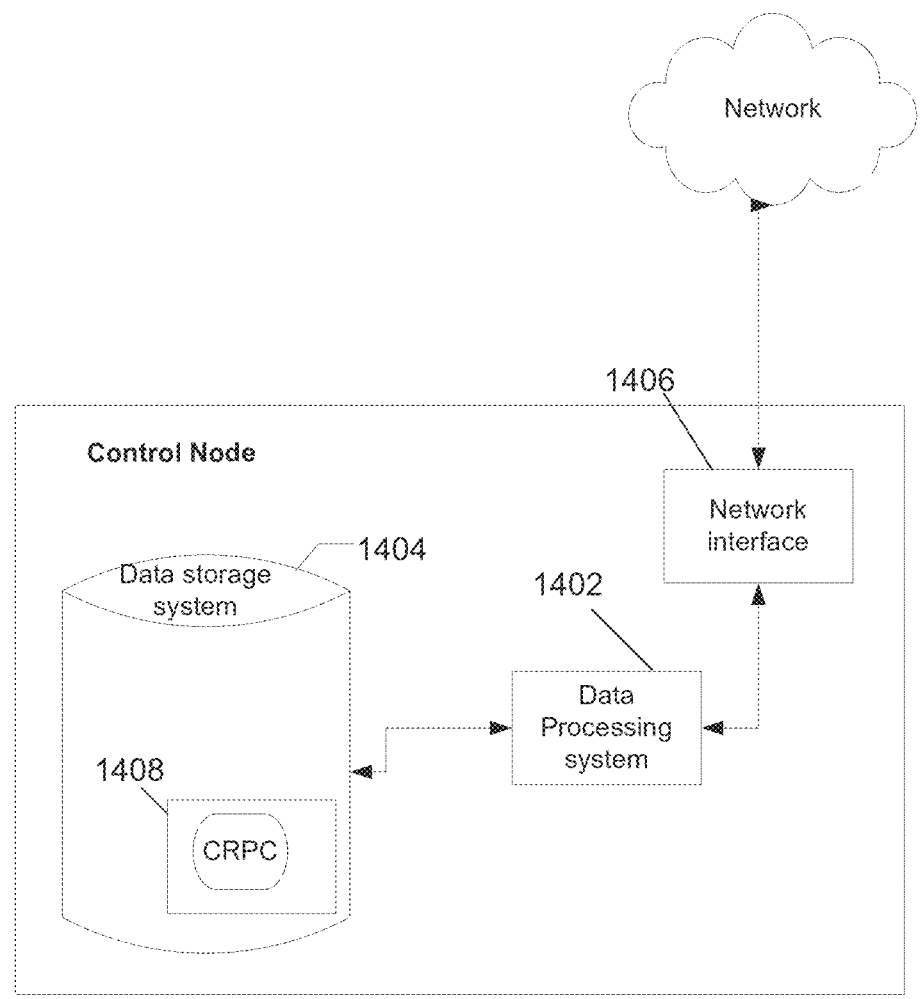
FIG. 14 is an exemplary illustration of a control node.

FIG. 14 illustrates a block diagram of an exemplary control node, such as node 708 shown in FIG. 7. As shown in FIG. 14, the control node 710 may include: a data processing system 1402, which may include one or more microprocessors and/or one or more circuits, such as an application specific integrated circuit (ASIC), field-programmable gate arrays (FPGAs), and the like; a network interface 1406, and a data storage system 1404, which may include one or more non-volatile storage devices and/or one or more volatile storage devices (e.g., random access memory (RAM)). According to some embodiments, the data processing system 1402 may comprise a control unit used for selection of transmission parameters.

In embodiments where data processing system 1402 includes a microprocessor, computer readable program code (CRPC) 1408 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1402 to perform steps described above (e.g., steps described above with reference to the flow charts shown in FIG. 9). In other embodiments, the control node 710 is configured to perform steps described herein without the need for code. That is, for example, data processing system 1402 may consist merely of one or more ASICs. Hence, the features of the embodiments described herein may be implemented in hardware and/or software. For example, in particular embodiments, the functional components of the base station described above may be implemented by data processing system 1402 executing computer instructions, by data processing system 1402 operating independent of any computer instructions, or by any suitable combination of hardware and/or software.

Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP 3rd Generation Partnership Project
ANDSF Access Network Discover and Selection Function
AP Access Point
APN Access Point Name
ARP Allocation Retention Priority
BSS Base Station Subsystem
eNB eNodeB
EPC Evolved Packet Core
EPS Evolved Packet System
E-RAB E-UTRAN Radio Access Bearer
E-UTRAN Evolved Universal Terrestrial Radio Access Network
FMC Fixed Mobile Convergence
FTP File Transfer Protocol
GBR non-Guaranteed Bit Rate
IFOM IP flow mobility
LTE Long Term Evolution
MAPCON Multi Access PDN Connectivity
MBR Maximum Bit Rate
MME Mobility Management Entity
MSC Mobile Switching Center
NACK Negative Acknowledgement PDN Packet Data Network
PDU Protocol Data Unit
PGW PDN Gateway
QCI Quality of Service (QoS) Class Identifier
RAN Radio Access Network
RAT Radio Access Technology
SGW Serving Gateway
TDD Time Domain Duplex
TWAG Trusted Wireless Access Gateway
UE User Equipment
WCD Wireless Communication Device
WLAN Wireless Local Area Network

The invention claimed is:

1. A method, implemented in a first node, that is in communication with a second node and a mobile device, the method comprising:

the first node determining a traffic type of a first traffic bearer within a packet data network connection between the second node and the mobile device;

the first node marking the first traffic bearer as movable or non-movable based on the determined traffic type; and the first node, in response to determining that the first traffic bearer has been marked as non-movable based on the traffic type of the first traffic bearer, marking all other traffic bearers in the packet data network connection between the second node and the mobile device as non-movable, wherein a traffic bearer marked as non-movable prevents the traffic bearer from being moved to another packet data network connection while the communication between the second node and the mobile device of the marked traffic bearer is maintained.

2. The method according to claim 1, further comprising updating a movability marker of the traffic bearers in the packet data network connection between the second node and the mobile device in response to determining that the first traffic bearer is removed.

3. The method according to claim 2, wherein updating the movability of the traffic bearers includes marking all remaining traffic bearers as movable in response to determining that all remaining traffic bearers are of a movable traffic type.

4. The method according to claim 1, further comprising:

in response to determining that a second traffic bearer is added to the packet data network connection between the second node and the mobile device, determining a traffic type of the second traffic bearer;

marking the second traffic bearer as movable or non-movable based on the determined traffic type of the second traffic bearer; and in response to determining that the second traffic bearer has been marked as non-movable, marking all other traffic bearers in the packet data network connection between the second node and the mobile device as non-movable.

5. The method according to claim 4, further comprising updating the movability marking of the traffic bearers in the packet data network connection between the second node and the mobile device in response to determining that the second traffic bearer is removed.

6. The method according to claim 1, wherein the first node is a core network entity and the second node is a packet gateway.

7. The method according to claim 1, wherein the movability of the traffic bearer is stored in an information element.

8. The method according to claim 1, further comprising:
marking the first traffic bearer as non-movable in response to determining that that the traffic type of the first traffic bearer is voice data.

9. The method according to claim 1, further comprising:
marking the first traffic bearer as movable in response to determining that that the traffic type of the first traffic bearer is video.

10. A method, implemented in a mobile device, that is in communication with a first node and a second node in a first communication network, the method comprising:
the mobile device receiving a notification indicating the movability of a first traffic bearer within a packet data network connection between the mobile device and the second node; and
the mobile device initiating traffic steering to a second communications network based on one or more predetermined conditions,
wherein the first traffic bearer is marked as movable or non-movable based on a traffic type of the first traffic bearer,
wherein the movability of the first traffic bearer indicates the first traffic bearer as movable or non-movable, and
wherein the first traffic bearer marked as non-movable prevents the first traffic bearer from being moved to another packet data network connection while the communication between the first node and second node of the marked first traffic bearer is maintained.

11. The method according to claim 10, wherein traffic steering includes an offloading of all traffic bearers between the mobile device and the first communication network marked as movable.

12. The method according to claim 10, wherein the predetermined condition includes the signal quality of the first communication network or the signal quality of the second communication network.

13. The method according to claim 10, wherein the first communication network is a 3rd Generation Partnership Project (3GPP) network and the second communication network is a wireless local-area network (WLAN).

14. The method according to claim 10, wherein the one or more predetermined conditions includes receiving a traffic steering command for a set of one or more traffic bearers, wherein the method further comprises:
receiving the traffic steering command; and
in response to determining the mobile device is not capable of handling partial unloading, for each traffic bearer specified in the traffic steering command:
checking the movability of each traffic bearer within the same packet data network connection as the traffic bearer to be steered;
in response to determining that all traffic bearers within the same packet data network connection as the traffic bearer to be steered are marked as movable, steering all traffic bearers within the packet data network connection of the traffic bearer to be steered to a second communication network; and
in response to determining that any of the traffic bearers within the packet data network connection of the traffic bearer to be steered are marked as non-movable, sending a NACK message to the first communication network.

15. The method according to claim 14, wherein the NACK message indicates a reason for not offloading the packet data network connection.

16. A first node that is in communication with a second node and a mobile device comprising:
a processor;
a memory coupled to the processor, wherein the processor is configured to:
determine a traffic type of a first traffic bearer within a packet data network between the second node and the mobile device;
mark the first traffic bearer as movable or non-movable based on the determined traffic type; and
in response to determining that the first traffic bearer has been marked as non-movable based on the traffic type of the first traffic bearer, marking all other traffic bearers in the packet data network connection between the second node and the mobile device as non-movable,
wherein a traffic bearer marked as non-movable prevents the traffic bearer from being moved to another packet data network connection while the communication between the first node and second node of the marked traffic bearer is maintained.

17. The first node according to claim 16, wherein the processor is further configured to:
update a movability marker of the traffic bearers in the packet data network connection between the second node and the mobile device in response to determining that the first traffic bearer is removed.

18. The first node according to claim 17, wherein updating the movability of the traffic bearers includes marking all remaining traffic bearers as movable in response to determining that all remaining traffic bearers are of a movable traffic type.

19. The first node according to claim 16, wherein the processor is further configured to:
determine a traffic type of a second traffic bearer is response to determining that the second traffic bearer is added to the packet data network connection between the second node and the mobile device;
mark the second traffic bearer as movable or non-movable based on the determined traffic type of the second traffic bearer; and
mark all other traffic bearers in the packet data network connection between the second node and the mobile device as non-movable in response to determining that the second traffic bearer has been marked as non-movable.

20. The first node according to claim 19, wherein the processor is further configured to:
update the movability marking of the traffic bearers in the packet data network connection between the second node and the mobile device in response to determining that the second traffic bearer is removed.

21. The first node according to claim 16, wherein the first node is a core network entity and the second node is a packet gateway.

22. The first node according to claim 16, wherein the movability of the traffic bearer is stored in an information element.

23. The first node according to claim 16, wherein the processor is further configured to:

mark the first traffic bearer as non-movable in response to determining that the traffic type of the first traffic bearer is voice data.

24. The first node according to claim 16, wherein the processor is further configured to:
mark the first traffic bearer as movable in response to determining that the traffic type of the first traffic bearer is video.

25. A mobile device, that is in communication with a first node and a second node in a first communication network, comprising:
a processor;
a memory coupled to the processor;
a transceiver coupled to the processor; and
an antenna coupled to the transceiver configured to transmit and receive messages;
wherein the processor is configured to:
receive a notification indicating the movability of a first traffic bearer within a packet data network connection between the mobile device and the second node; and
initiate traffic steering to a second communication network based on one or more predetermined conditions,
wherein the first traffic bearer is marked as movable or non-movable based on a traffic type of the first traffic bearer,
wherein the movability of the first traffic bearer indicates the first traffic bearer as movable or non-movable, and
wherein the first traffic bearer marked as non-movable prevents the first traffic bearer from being moved to another packet data network connection while the communication between the first node and second node of the marked first traffic bearer is maintained.

26. The mobile device according to claim 25, wherein traffic steering includes an offloading of all traffic bearers between the mobile device and the first communication network marked as movable.

27. The mobile device according to claim 25, wherein the predetermined condition includes the signal quality of the first communication network or the signal quality of the second communication network.

28. The mobile device according to claim 25, wherein the first communication network is a 3rd Generation Partnership Project (3GPP) network and the second communication network is a wireless local-area network (WLAN).

29. The mobile device according to claim 25, wherein the one or more predetermined conditions includes receiving a traffic steering command for a set of one or more traffic bearers, wherein the processor is further configured to:
receive the traffic steering command; and
in response to determining the mobile device is not capable of handling partial unloading, for each traffic bearer specified in the traffic steering command:
check the movability of each traffic bearer within the same packet data network connection as the traffic bearer to be steered;
steer all traffic bearers within the packet data network connection of the traffic bearer to be steered to the second communication network in response to determining that all traffic bearers within the same packet data network connection as the traffic bearer to be steered are marked as movable; and
send a NACK message to the first communication network in response to determining that any of the traffic bearers within the packet data network connection of the traffic bearer to be steered are marked as non-movable.

30. The mobile device according to claim 29, wherein the NACK message indicates a reason for not offloading the packet data network connection.

* * * * *